US012270221B2

(12) United States Patent
Merigian

(10) Patent No.: US 12,270,221 B2
(45) Date of Patent: Apr. 8, 2025

(54) KIT FOR ERECTING A PREFABRICATED WATER CONTAINMENT STRUCTURE AND METHODS OF USE

(71) Applicant: Kevin S. Merigian, Eads, TN (US)

(72) Inventor: Kevin S. Merigian, Eads, TN (US)

(*) Notice: Subject to any disclaimer, the term of this patent is extended or adjusted under 35 U.S.C. 154(b) by 200 days.

(21) Appl. No.: 18/101,900

(22) Filed: Jan. 26, 2023

(65) Prior Publication Data

US 2023/0235585 A1 Jul. 27, 2023

Related U.S. Application Data

(60) Provisional application No. 63/303,328, filed on Jan. 26, 2022.

(51) Int. Cl.
*E04H 4/00* (2006.01)
*B05B 17/08* (2006.01)

(52) U.S. Cl.
CPC ........... *E04H 4/005* (2013.01); *E04H 4/0093* (2013.01); *B05B 17/08* (2013.01)

(58) Field of Classification Search
CPC ........ E04H 4/005; E04H 4/0093; B05B 17/08
USPC ....... 4/614, 506–513, 488; 52/79.1, 69, 234, 52/578, 220.7, 238.1, 221, 173, 169.7, 52/586, 64, 6, 70, 71, 79.5; 482/55; 29/428, 401.1; 446/478, 488; 428/3
See application file for complete search history.

(56) References Cited

U.S. PATENT DOCUMENTS 3,444,659 A * 5/1969 Shanni .................... E04H 4/142 52/169.8
3,518,704 A * 7/1970 Shanni .................... E04H 4/142 52/300
3,710,401 A * 1/1973 Goettl .................... B65D 90/12 220/240
4,229,919 A * 10/1980 Hughes .................. A47C 11/00 52/741.1

(Continued)

FOREIGN PATENT DOCUMENTS

AU 2011202281 A1 * 12/2012
CA 3007085 A1 * 6/2019 ............. E04B 1/348

(Continued)

*Primary Examiner* — Lori L Baker
(74) *Attorney, Agent, or Firm* — HULSEY P.C.

(57) ABSTRACT

Kit including prefabricated components for erecting a prefabricated water containment structure. The kit includes all parts necessary for erecting a prefabricated water feature or containment enclosure. The kit includes a prefabricated three-inch structural steel channel of various lengths, steel support struts, corner sections, steel corner support gussets, a centre steel support band, eight steel attachment plates, four airplane cord channel joining devices, concrete board inner and outer wall panels, containing all the necessary cut-outs to accommodate prefabricated plumbing and electrical assemblies. The kit further includes rivets, stainless steel bolts, lock washers and nuts. The kit includes a prefabricated submersible hollow concrete water pump pedestal for water containment structures. The kit also includes all the required piping and wiring needed to connect plumbing and electrical assemblies to external sources. The kit helps homeowners, residential and commercial builders, landscape architects for constructing a water feature, fountain base, or water reservoir.

14 Claims, 12 Drawing Sheets

(56) References Cited

U.S. PATENT DOCUMENTS

| | | | | | |
|---|---|---|---|---|---|
| 4,416,420 | A * | 11/1983 | Thompson | B05B 17/08 | 239/22 |
| 5,070,661 | A * | 12/1991 | Lo Guidici | E04B 1/34336 | 52/234 |
| 5,311,718 | A * | 5/1994 | Trousilek | E04B 2/8641 | 52/439 |
| 5,398,351 | A * | 3/1995 | Watson | E04H 4/06 | 52/309.4 |
| 5,820,092 | A * | 10/1998 | Thaler | F24F 13/32 | 248/676 |
| 5,950,373 | A * | 9/1999 | von Hoff | E04B 1/3442 | 52/79.5 |
| 6,004,182 | A * | 12/1999 | Pasin | E04H 15/44 | 446/490 |
| 6,647,562 | B1 * | 11/2003 | Arout | E04H 4/0043 | 4/584 |
| 7,917,974 | B2 * | 4/2011 | Casadio | E04H 4/0043 | 4/506 |
| 8,109,044 | B2 * | 2/2012 | Graber | A47K 3/30 | 52/36.2 |
| 9,523,208 | B2 * | 12/2016 | Athanasiou | E04H 1/12 | |
| 10,479,456 | B1 * | 11/2019 | Diserio | E02B 3/068 | |
| 11,473,294 | B2 * | 10/2022 | Russell | E04B 1/7675 | |
| 11,697,946 | B2 * | 7/2023 | Morrow | E04H 4/0075 | 4/506 |
| 2002/0020012 | A1 * | 2/2002 | Foy | E04H 4/0018 | 4/506 |
| 2003/0226323 | A1 * | 12/2003 | Travez | E04F 13/083 | 52/220.7 |
| 2004/0187414 | A1 * | 9/2004 | Brochu | E04H 6/02 | 52/272 |
| 2008/0263968 | A1 * | 10/2008 | Day | E04B 1/34321 | 52/309.4 |
| 2009/0126280 | A1 * | 5/2009 | Radi | E04B 2/02 | 52/168 |
| 2009/0260151 | A1 * | 10/2009 | Graber | A47K 3/30 | 4/599 |
| 2011/0300312 | A1 * | 12/2011 | Hickey | A63J 1/00 | 428/3 |
| 2015/0308135 | A1 * | 10/2015 | Athanasiou | E04H 1/12 | 52/79.5 |
| 2016/0237705 | A1 * | 8/2016 | Wee | E04H 15/008 | |
| 2019/0194932 | A1 * | 6/2019 | Russell | E04B 1/3483 | |
| 2023/0082387 | A1 * | 3/2023 | Russell | E04B 1/3483 | 52/79.1 |
| 2023/0151627 | A1 * | 5/2023 | Massa | E04H 4/1227 | 4/506 |
| 2023/0228113 | A1 * | 7/2023 | Cohen | B29C 70/682 | 4/506 |

FOREIGN PATENT DOCUMENTS

| | | | | |
|---|---|---|---|---|
| CN | 208395888 | U * | 1/2019 | |
| CN | 112718364 | | 4/2021 | |
| CN | 112718364 | A * | 4/2021 | B05B 12/08 |
| CN | 107090911 | B * | 6/2021 | B63B 17/02 |
| EP | 1760225 | A1 * | 3/2007 | E04H 4/0043 |
| FR | 2852620 | A1 * | 9/2004 | E04H 9/02 |
| FR | 3142680 | A1 * | 6/2024 | B05B 17/08 |
| WO | WO-0202891 | A1 * | 1/2002 | E04H 4/0018 |
| WO | WO-2005019537 | A1 * | 3/2005 | E02D 27/01 |
| WO | WO-2006096997 | A1 * | 9/2006 | E04B 1/24 |
| WO | WO-2010020025 | A1 * | 2/2010 | E04B 1/34315 |
| WO | WO-2014089596 | A1 * | 6/2014 | E04B 1/40 |
| WO | WO-2017140187 | A1 * | 8/2017 | B28B 15/00 |
| WO | WO-2018101891 | A1 * | 6/2018 | E04B 1/34384 |
| WO | WO-2019051049 | A1 * | 3/2019 | B29C 70/06 |

* cited by examiner

KIT FOR ERECTING A PREFABRICATED WATER CONTAINMENT STRUCTURE AND METHODS OF USE

The present application claims the benefit of U.S. Provisional Application No. 63/303,328, filed Jan. 26, 2022; all of which is incorporated herein by reference.

FIELD

The present subject matter generally relates to construction of a fountain or a waterfall in a body of water. More specifically, the present subject matter relates to a kit containing all parts formed of prefabricated water feature or containment structures necessary for constructing a yard fountain.

BACKGROUND

Waterfalls and fountains provide aesthetic and pleasant sounds, help to regulate the temperature of the water, etc. The enduring popularity of both waterfalls and fountains make them desirable for artistic, recreational and commercial uses. There are numerous prefabricated modular water containment structures that homeowners, residential and commercial builders, landscape architects can use for a water feature, fountain base, or water reservoir. The water containment structures include, but not limited to, roughs, galvanized and plastic water basins, concrete prefabricated fountain basins. Most water containment structures are made on-site with formed poured concrete bottoms and walls and gunite or shotcrete surfacing. Landscape architects and engineers utilize various techniques for backyard ponds and stream creation using different liner materials.

There is a continuing and growing need for homeowners and commercial buildings to have water features. Small spaces require innovative techniques to provide water containment structures with moving water.

Several techniques have been disclosed in the past to provide water containment structures. One such example is disclosed in a U.S. Pat. No. 4,416,420, entitled, "Portable Fountain for Pools or Spas" ("the '420 patent"). The '420 patent discloses a pool or spa portable fountain which comprises a pedestal, an upright tube supported by the pedestal, a duct which is supported by the pedestal to extend upwardly within the tube, a discharge head which is connected to the upper end of the duct and is capable of discharging water under pressure to form a fountain spray pattern, and a hose extending from a lower portion of the duct and via the interior of the pedestal to the exterior thereof, to receive a pressurized stream of water for delivery to the duct. The pedestal and tube are dimensioned so as to have the top portion of the tube project above the water surface level when the fountain is positioned on the bottom of the pool.

Another example is disclosed in a Chinese Patent Publication No. 112718364, entitled, "Controllable Multi-Functional Fountain Water Type Device of Water Type And Water Yield" ("the '364 Publication"). The '364 Publication discloses a water type and controllable multi-functional fountain water type device of water yield, including: the base, all bolted connections have fixed frame around the base top, the central department bolted connection at base top has fixed pipe. The water pump is used for conveying the purified water into the fan-shaped spray heads, so that the water type is molded into a fan shape, the ornamental value of the fountain is improved. A user can conveniently convey the purified water into the drain pipe by using the water pump through the matching of the water pipe, the connecting pipe, the drain pipe, the pipeline and the spray heads, the ornamental value of the fountain is further improved.

The above-discussed devices have few problems. For example, fountains routinely require that the water pumps remain in clear sight. The designs are functional; however, they are visually unappealing. Premanufactured fountains commonly hide water pumps within the structure's construction, making it difficult to repair or replace water pumps. In addition, the premanufactured fountains themselves are typically uniform and lack creative variation.

Therefore, there is a need for a kit containing all parts necessary for erecting a prefabricated water feature or containment structures that homeowners, residential and commercial builders, landscape architects can use for a water feature, fountain base, or water reservoir. In addition, there is a need for creative spirit to expand, allowing for innovative designs and an inexpensive economic alternative to the prefabricated water features.

SUMMARY

It is an object of the present subject matter to provide a kit containing all parts necessary for erecting a prefabricated water feature or containment structures and that avoids the drawbacks of known water containment structures or premanufactured fountains.

It is another object of the present subject matter to provide a prefabricated submersible hollow concrete water pump pedestal for water containment structures.

In order to achieve one or more objects, the present subject matter presents a kit containing all parts necessary for erecting a prefabricated water feature or containment enclosure that homeowners, residential and commercial builders, landscape architects can use for a water feature, fountain base, or water reservoir.

In one aspect of the present subject matter, the kit includes a prefabricated three-inch structural steel channels of various lengths, steel support struts, corner sections, steel corner support gussets, a centre steel support band, eight steel attachment plates, four airplane cord channel joining devices, ethylene propylene diene monomer (EPDM) liners, concrete board inner and outer wall panels, containing all the necessary cut-outs to accommodate prefabricated plumbing and electrical assemblies. The kit further includes rivets, stainless steel screws, lock washers and nuts, and liner metal terminating strip required for erecting the prefabricated water feature. The kit also includes all the required piping and wiring needed to connect plumbing and electrical assemblies to external sources. In addition, the kit includes instructions for footer placement and levelling the structure on location.

In one advantageous feature of the present subject matter, the kit allows for excellent utility and expands choices when designing water features for home and commercial use.

In another advantageous feature of the present subject matter, the kit allows for constructing a water containment structure that is simple and permanent. The kit can be easily deconstructed and moved with minimal effort.

In another aspect, the present subject matter discloses a prefabricated submersible hollow concrete water pump pedestal for water containment structures that homeowners, residential and commercial builders, landscape architects can use for a water feature or fountain. The hollow pedestal is made from poured concrete stabilized with a steel rebar inner frame i.e., from a concrete panel riveted to a cage of tubular steel. The pump housing accommodates most commercially available water pumps. The pump housing incorporates debris filtering water return without skimmer boxes. The pedestal contains all the necessary cut-outs to accommodate prefabricated plumbing and electrical assemblies for fountain construction. The pump housing also includes all the required piping and wiring needed to connect polyvinyl chloride (PVC) plumbing and electrical assemblies to external sources. The pump housing includes a plurality of adjustable supporting techniques for levelling the pedestal on location within the water containment structure.

In one advantageous feature of the present subject matter, the pump housing allows the creative spirit to expand, allowing for innovative designs and an inexpensive economic alternative to the prefabricated water features.

In another advantageous feature of the present subject matter, the kit helps to construct a yard structure that is unique with each use. The kit including prefabricated components can be sold and shipped for ease of construction and use.

Features and advantages of the subject matter hereof will become more apparent in light of the following detailed description of selected embodiments, as illustrated in the accompanying FIGUREs. As will be realised, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

Further features and advantages of the present subject matter will become apparent from the following detailed description, taken in combination with the appended drawings, in which.

It will be noted that throughout the appended drawings, like features are identified by like reference numerals.

DETAILED DESCRIPTION OF THE EMBODIMENTS

Before the present features and working principle of a kit is described, it is to be understood that this subject matter is not limited to the particular device as described, since it may vary within the specification indicated. Various features of a kit might be provided by introducing variations within the components/subcomponents disclosed herein. It is also to be understood that the terminology used in the description is for the purpose of describing the particular versions or embodiments only, and is not intended to limit the scope of the present subject matter, which will be limited only by the appended claims. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

The present subject matter discloses a kit including water containment structures and prefabricated submersible pump housing. The kit includes all parts necessary for erecting a prefabricated water feature or containment enclosure that homeowners, residential and commercial builders, landscape architects can use for a water feature, fountain base, or water reservoir. The kit includes a prefabricated three-inch structural steel channel of various lengths, steel support struts, corner sections, steel corner support gussets, a centre steel support band, eight steel attachment plates, four airplane cord channel joining devices, concrete board inner and outer wall panels, containing all the necessary cut-outs to accommodate prefabricated plumbing and electrical assemblies. The kit further includes rivets, stainless steel bolts, lock washers and nuts. The kit also includes all the required piping and wiring needed to connect such plumbing and electrical assemblies to external sources.

Various features and embodiments of a kit are explained in conjunction with the description of FIGS. 1-19.

Figure 1:
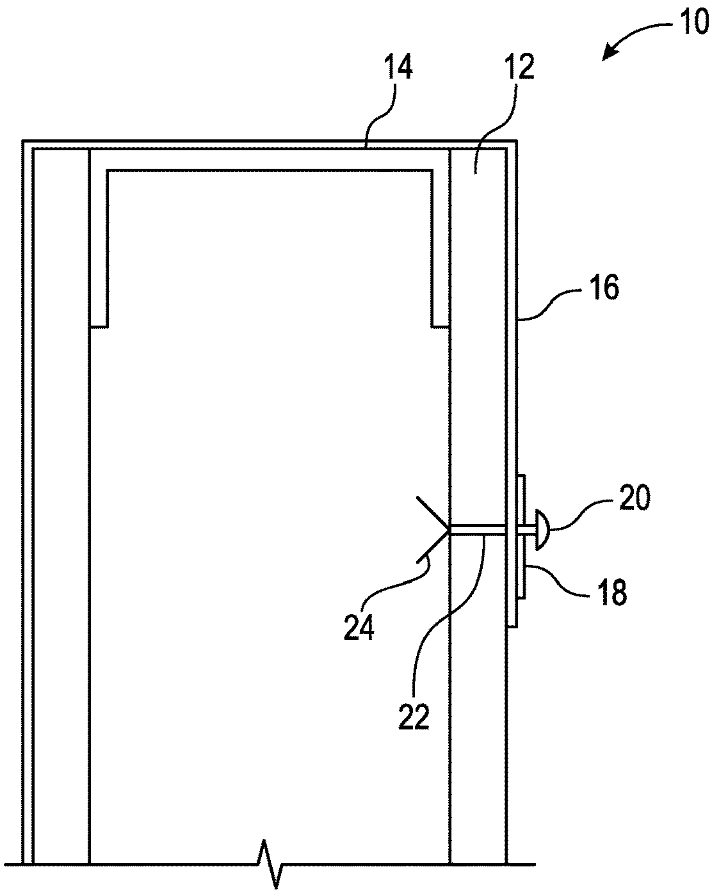
FIGS. 1 and 2 illustrate side views of prefabricated channels, in accordance with one embodiment of the present subject matter.
Figure 2:
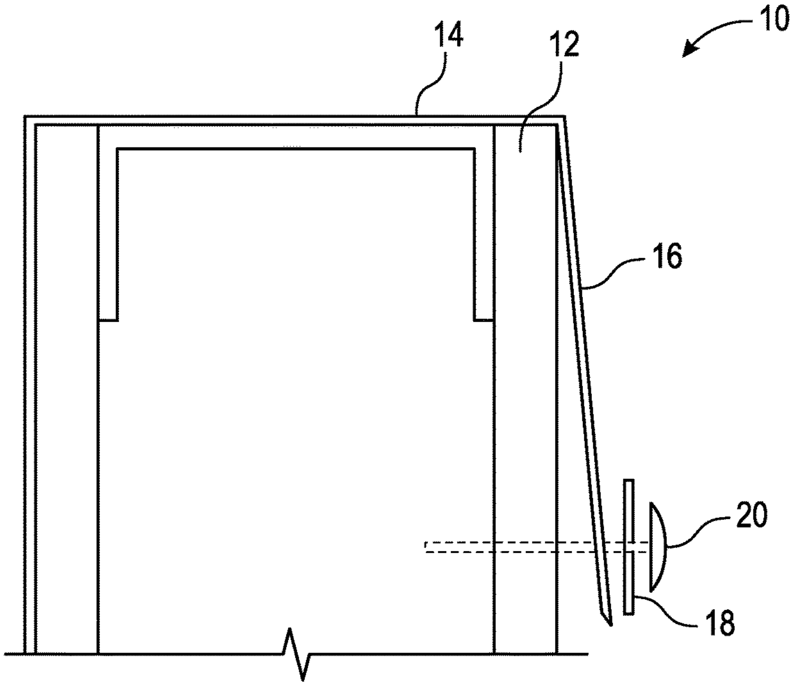

FIG. 1 shows a side view of an assembled construct of the prefabricated channels 10, in accordance with one embodiment of the present subject matter. Prefabricated channels 10 includes liner support walls 12 placed in parallel i.e., opposite to each other. Walls 12 are made using concrete panels. Walls 12 connect by connecting channel 14. Connecting channel 14 comes in a U-shaped structure and are made using metal such as steel, for example. In one example, Walls 12 and connecting channel 14 provide a material made of metal, wood, plastic or any other suitable material. Prefabricated channels 10 present ethylene propylene diene monomer (EPDM) liner 16 extending over channels 12 and connecting channel 14. Liner 16 drapes over to walls 12 fastened in place by the metal termination strip 18. In one example, metal termination strip is aluminium; however other materials such as plastic, or steel could be substituted. Termination strip 18 mounts with the help of rivet 20. In one example, rivet 20 includes a stainless-steel screw. Rivet 20 includes bar 22 having bead 24 at its length. Bar 22 draws through channels 12 and allows termination strip fastener 20 to swing open to secure metal termination strip. FIG. 2 shows the feature of metal termination strip 18 in swing opened position, in accordance with one embodiment of the present subject matter.

Figure 3:
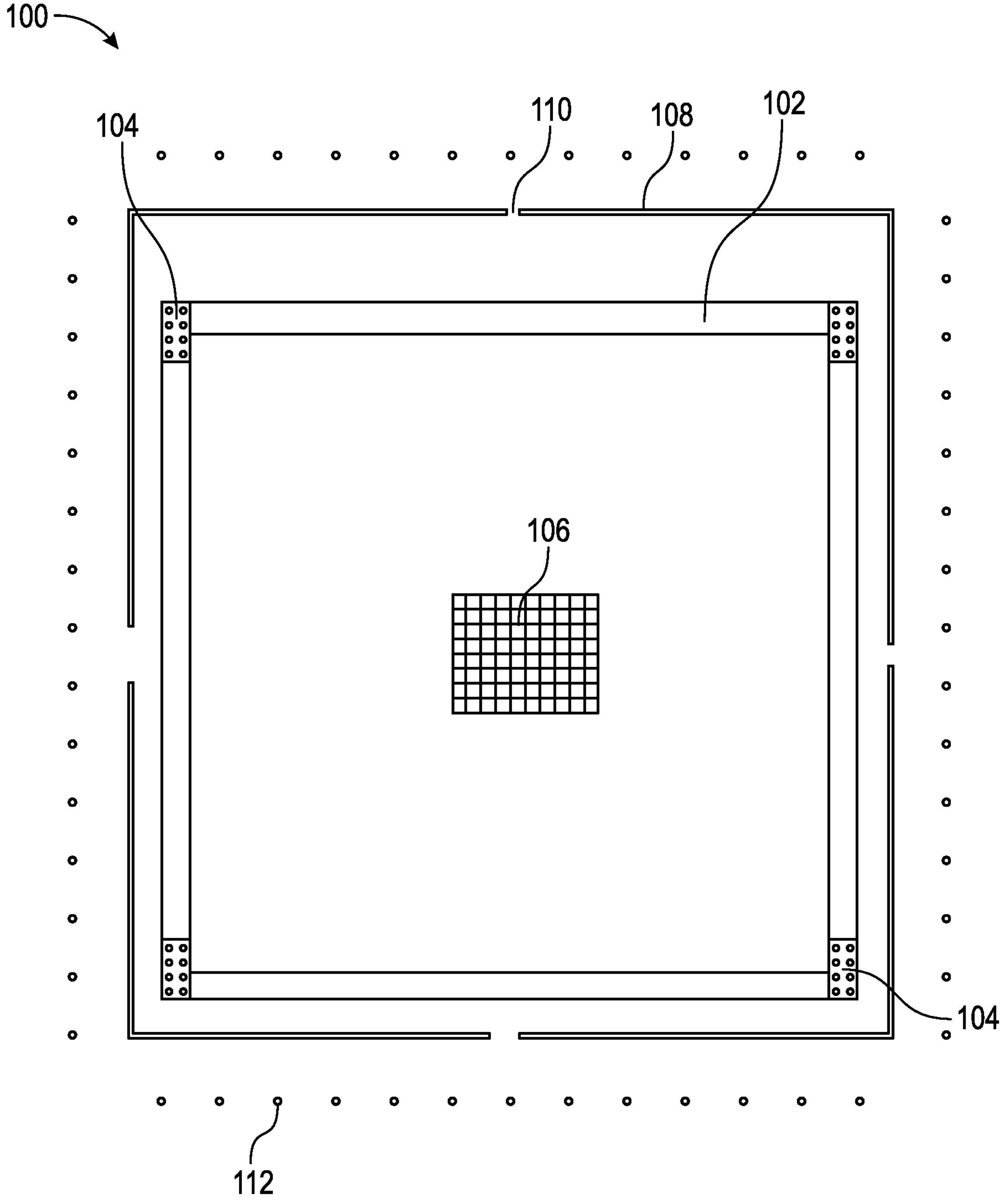
FIG. 3 illustrates top view of prefabricated channels, in accordance with one embodiment of the present subject matter.
Figure 4:
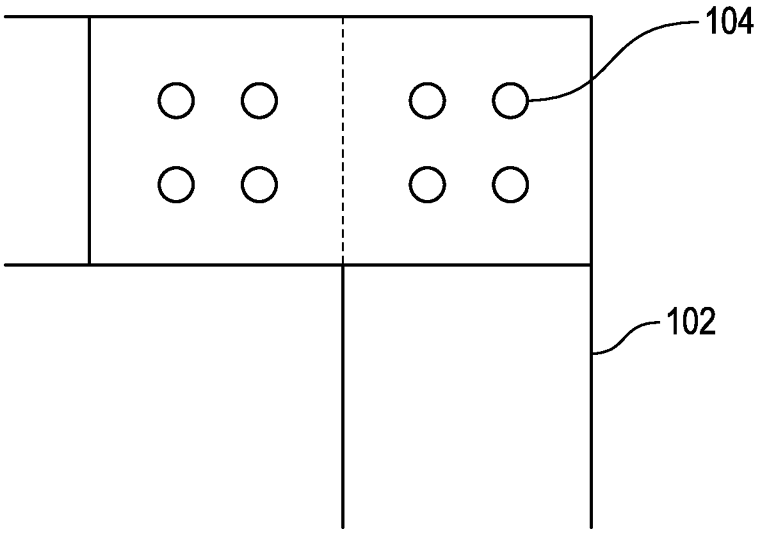
FIG. 4 illustrates a channel including holes, in accordance with one embodiment of the present subject matter.

FIG. 3 shows an overhead view of connected prefabricated steel channels 100, in accordance with another embodiment of the present subject matter. Prefabricated steel channels 102 connected by fish plates 104; positioned in a square or rectangular configuration. Steel Channels 102 include channel attachment fish plates or steel attachment plates 104 with holes at the corner, as shown in FIG. 4. Channels 102 include fountain pedestal concrete or gravel footing 106. Fountain pedestal footing 106 configures to receive concrete pump housing (not shown). Assembled Channels 100 include liner termination strips 108 surrounding them. Liner termination strips 108 present opening 110 at the centre. Liner termination strips 108 include stainless steel rivets 112 surrounding them. In one example, there are 56 holes surrounding liner termination strips 108. FIG. 4 shows the feature of channel attachment fish plate 104, in accordance with one embodiment of the present subject matter. Channel attachment fish plate 104 help to attach steel channels to each other 102.

Figure 5:
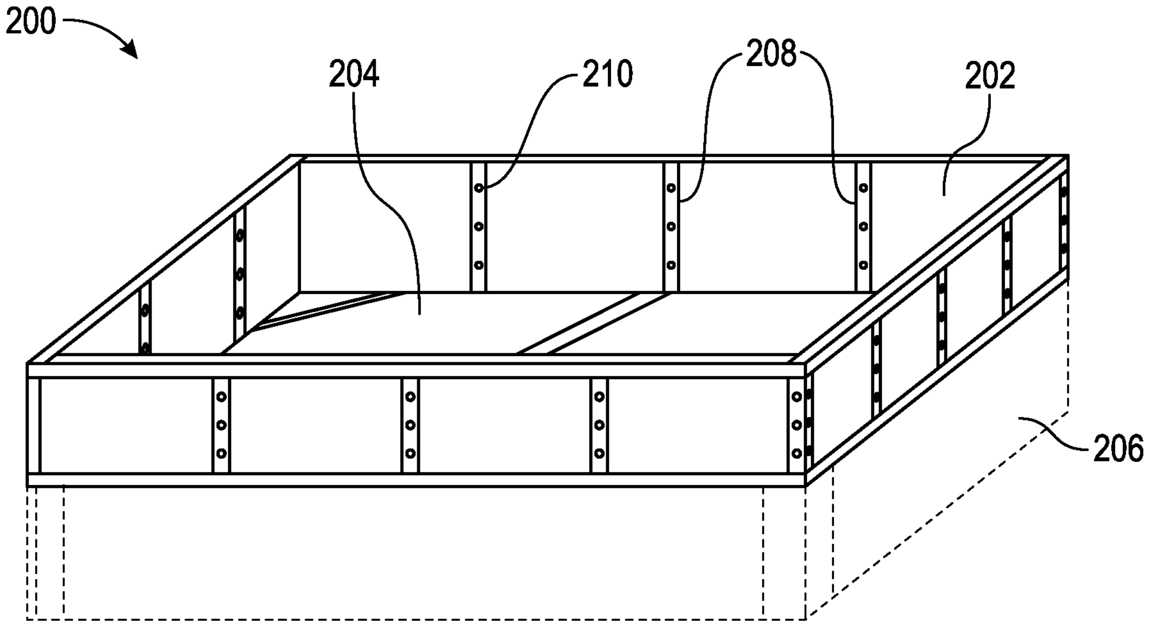
FIG. 5 illustrates a perspective view of building panels, in accordance with one embodiment of the present subject matter.

FIG. 5 shows a perspective view of building panels 200, in accordance with one embodiment of the present subject matter. Building panels 200 include panels 202 positioned in an upright matter (i.e., inner concrete board panel). Panels 202 for a square or rectangular shape. Panels 202 include sand base 204. Panels 202 and sand base 204 provide a material made of Finex™ fibre reinforced cement composite material or similar. Panels 202 include footer 206 that position underneath base 204. Footer 206 is made of concrete or gravel depending on the need. Footer 206 places in desired position and help to level panels 202 above it. Panels 202 include steel support struts 208 having rivet holes 210 made for stainless-steel rivets. Steel support struts 208 position beneath panels 202.

Figure 6:
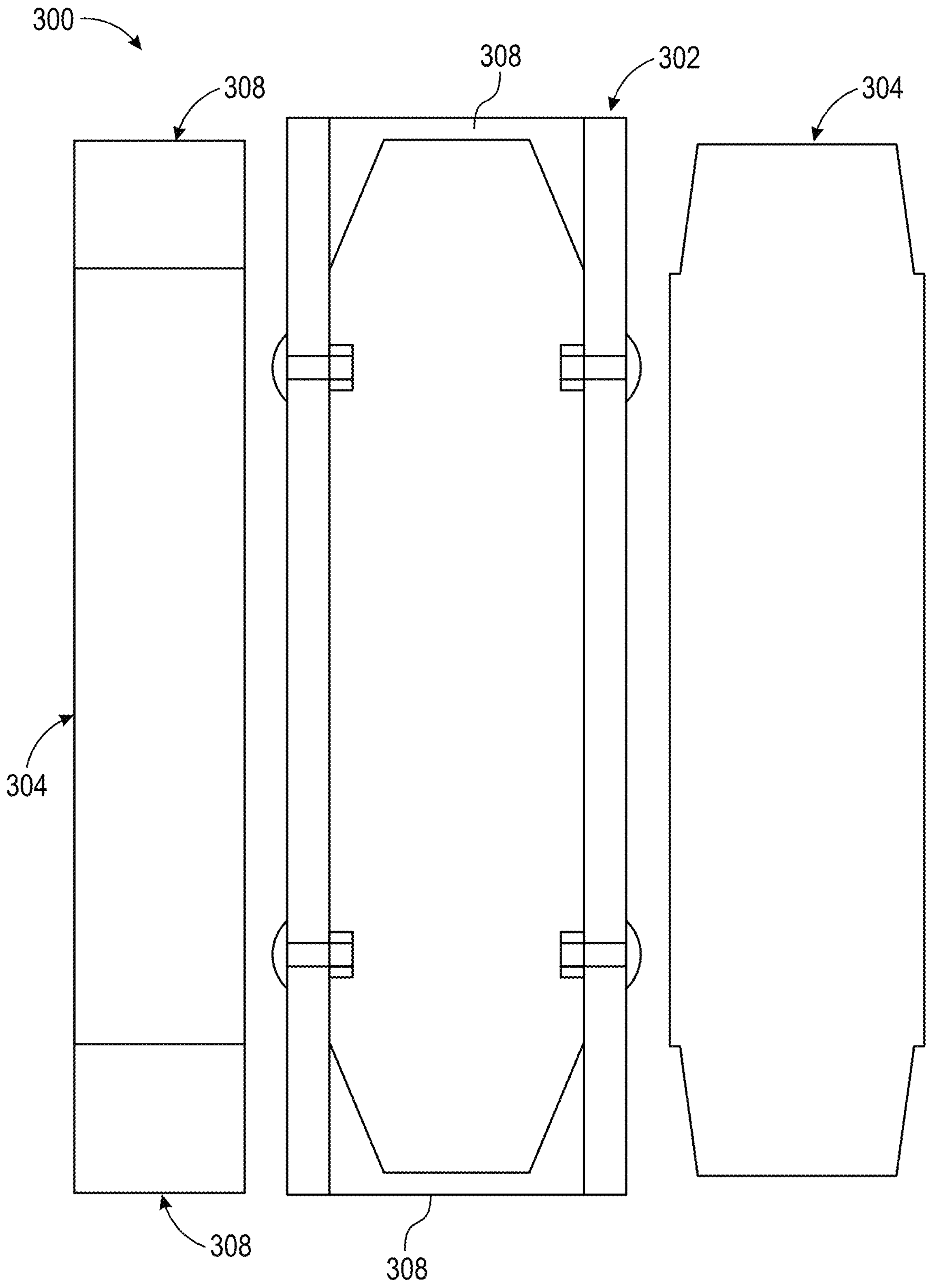
FIG. 6 illustrates a front and side views of individual containment structure support struts, in accordance with one embodiment of the present subject matter.

FIG. 6 shows a front view of peripheral strut 300 having concrete walls 302, and steel support struts 304. Tubular Steel support struts 304 connect to steel channels 308. Concrete panels 302 connect to steel support struts 304 with rivets to tubular steel struts 308 at the top and bottom. As can be seen, support struts 304 are sandwiched with steel channels 308.

Figure 7:
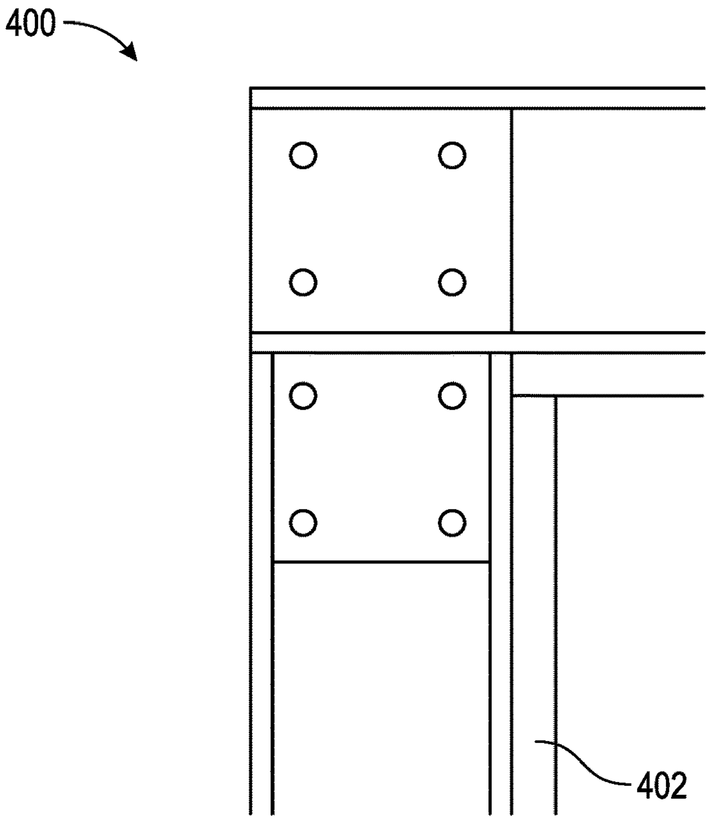
FIG. 7 illustrates a front view of corner support, in accordance with one embodiment of the present subject matter.
Figure 8:
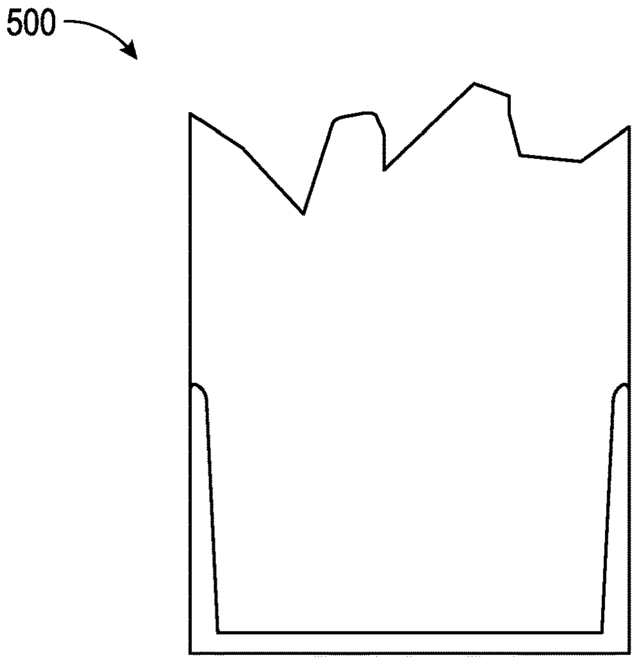
FIG. 8 illustrates a front view of support strut, in accordance with one embodiment of the present subject matter.
Figure 9:
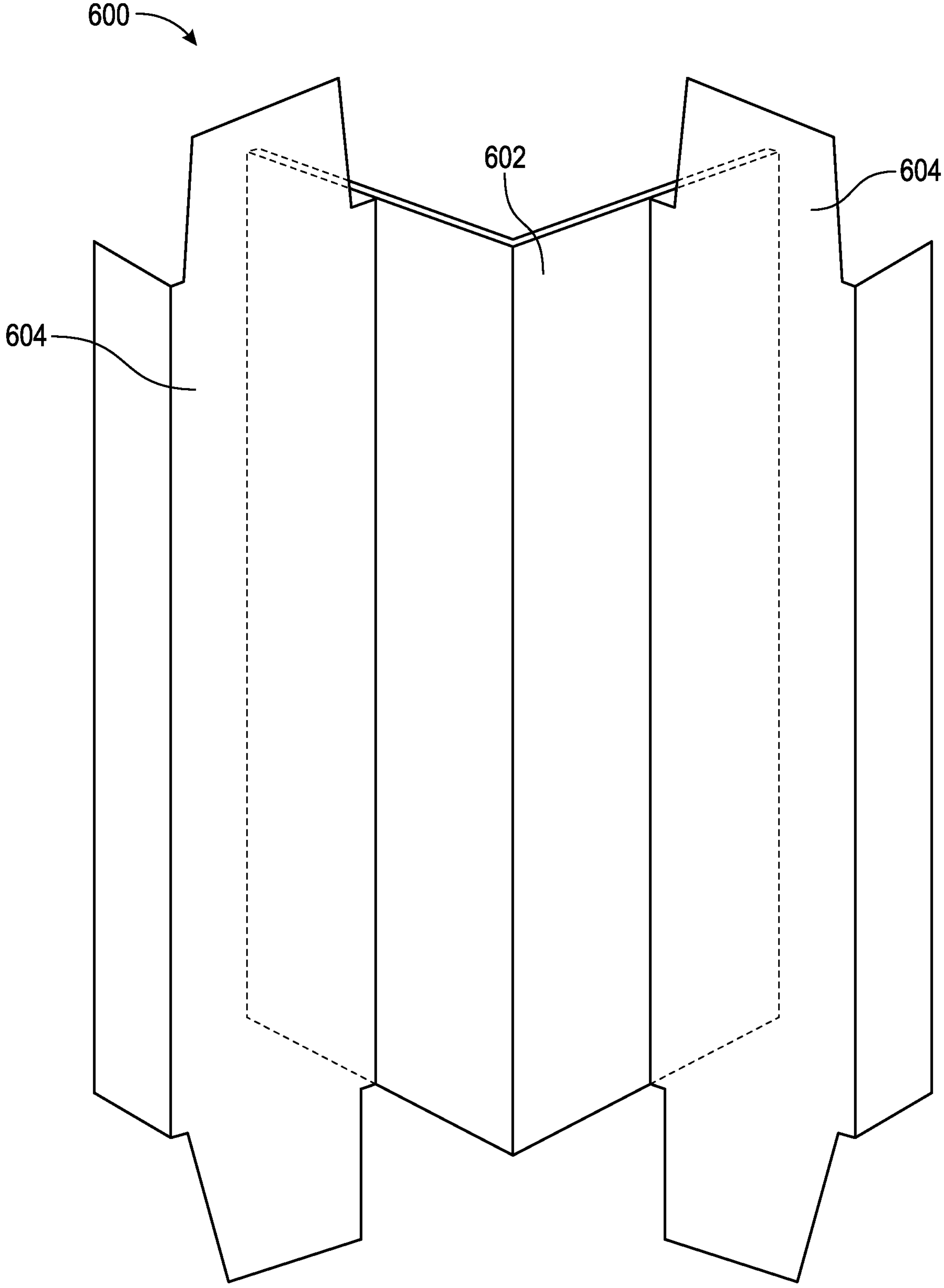
FIG. 9 illustrates a perspective view of corner piece, in accordance with one embodiment of the present subject matter.
Figure 10:
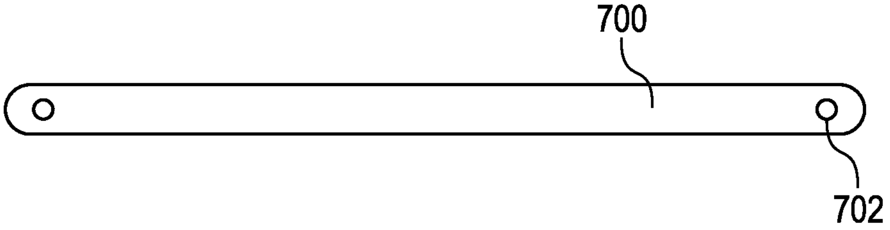
FIG. 10 illustrates an overhead view of connecting member, in accordance with one embodiment of the present subject matter.
Figure 11:
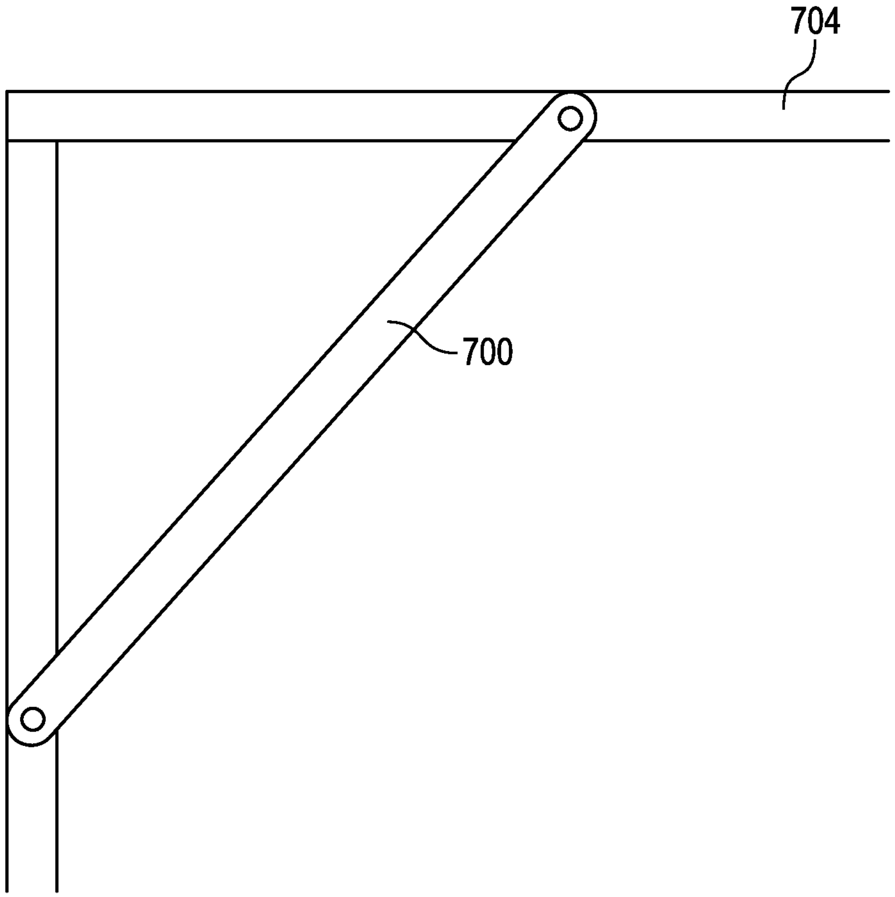
FIG. 11 illustrates an under-structure view of the connecting member connected to channel corners as a gusset, in accordance with one embodiment of the present subject matter.

FIG. 7 shows an overhead view of corner placement of interior concrete walls 400; 402 interior concrete walls, in accordance with one embodiment of the present subject matter. FIG. 8 shows a side view of tubular support member 500 i.e., support strut fit into channel, in accordance with one exemplary embodiment of the present subject matter. FIG. 9 shows a perspective view of corner piece 600, in accordance with one embodiment of the present subject matter. Unibody Corner piece 600 includes unibody corner support 602 with welded steel support struts to corner pieces 604. FIG. 10 shows an overhead view of corner connecting gusset member 700, in accordance with one embodiment of the present subject matter. Corner connecting gusset member 700 includes holes 702 at the end. FIG. 11 shows corner connecting gusset member 700 used to mount steel channel 704 at holes 702.

Figure 12:
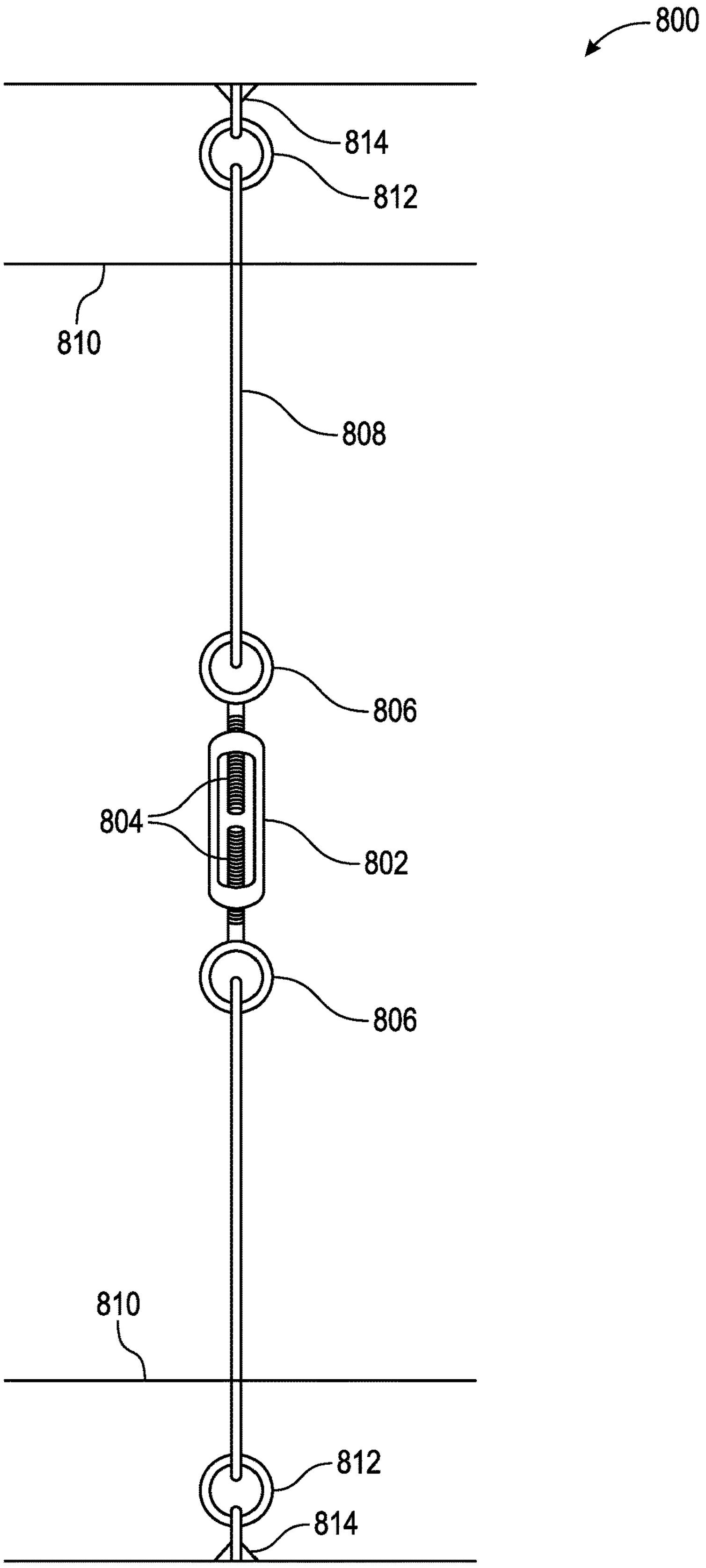
FIG. 12 illustrates a side view of support band between channels, in accordance with one embodiment of the present subject matter.

FIG. 12 shows a side view of support band 800, in accordance with one embodiment of the present subject matter. Support band 800 includes screw device housing 802 having threaded members 804. Threaded members 804 connect to first rings (attachment loop rings) 806. Attachment loop rings 806 connect to airplane cord cables 808. Airplane cord cables 808 extend and help to connect support band 800 to steel channels 810. Here, airplane cord cables 808 includes top channel and bottom channel. Both top channel and bottom channel include second rings 812 attached to steel rings 814. Steel channels 810 include welded attachments 814 that receive steel rings 812.

In accordance with the present subject matter, the kit includes components required for constructing a water containment structure such as a fountain, for example. The user can select the parts depending on the need and construct the water containment structure by installing the components available in the kit.

In one embodiment, the kit presents a prefabricated submersible hollow concrete water pump pedestal (hollow pedestal or pump housing) for water containment structures. The hollow pedestal is made from poured concrete stabilized with a steel rebar inner frame. The hollow pedestal accommodates water pumps. Here, the pump housing incorporates debris filtering water return without skimmer boxes. The hollow pedestal contains all the necessary cut-outs to accommodate prefabricated plumbing and electrical assemblies for fountain construction. The kit also includes all the required piping (not shown) and wiring (not shown) needed to connect PVC plumbing (not shown) and electrical assemblies (not shown) to external sources (not shown). The kit will also contain a plurality of adjustable supporting techniques for levelling the pedestal on location within the water containment structure.

Figure 13A:
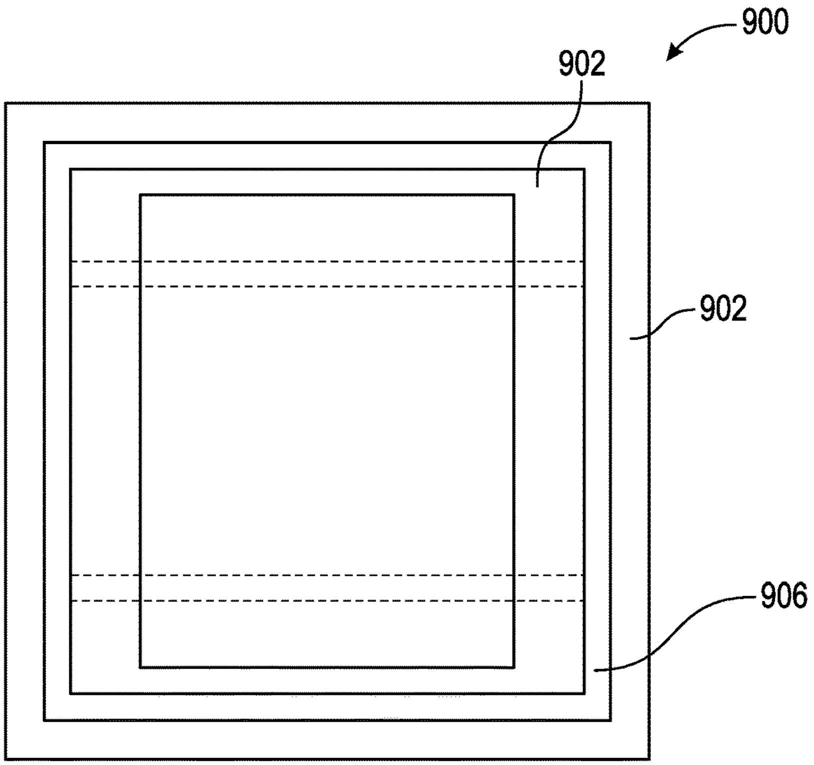
FIGS. 13A and 13B illustrate a top and bottom view, respectively of a pump housing, in accordance with one embodiment of the present subject matter.
Figure 13B:
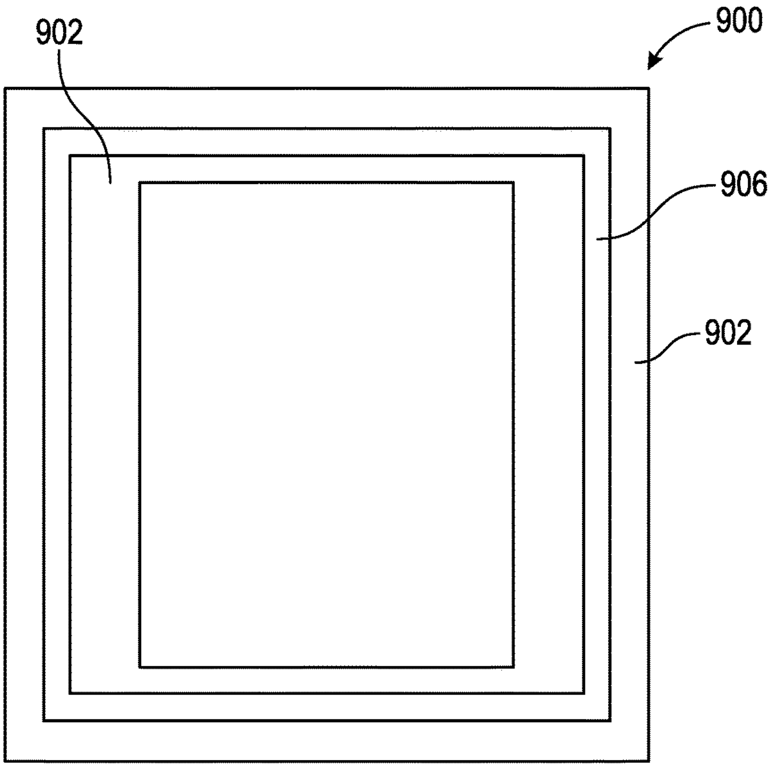

FIGS. 13A and 13B show a top and bottom view, respectively of pump housing 900, in accordance with one embodiment of the present subject matter. Pump housing 900 includes first concrete panels 902 and second concrete panels 902 made of concrete in one pour for the shell. First panels 902 indicate a steel support inner frame for pedestal surrounding second panels 902. Here, the hollow pedestal or first panels 902 is made from poured concrete stabilized with a steel rebar (reinforced bar) inner frame held in place by poured second panels 902. Pump housing 900 further includes rebar support strut 906 made of steel. Rebar support strut 906 supports wall section and one continuous por concrete panels 902 in pump housing 900.

Figures 14A, 14B:
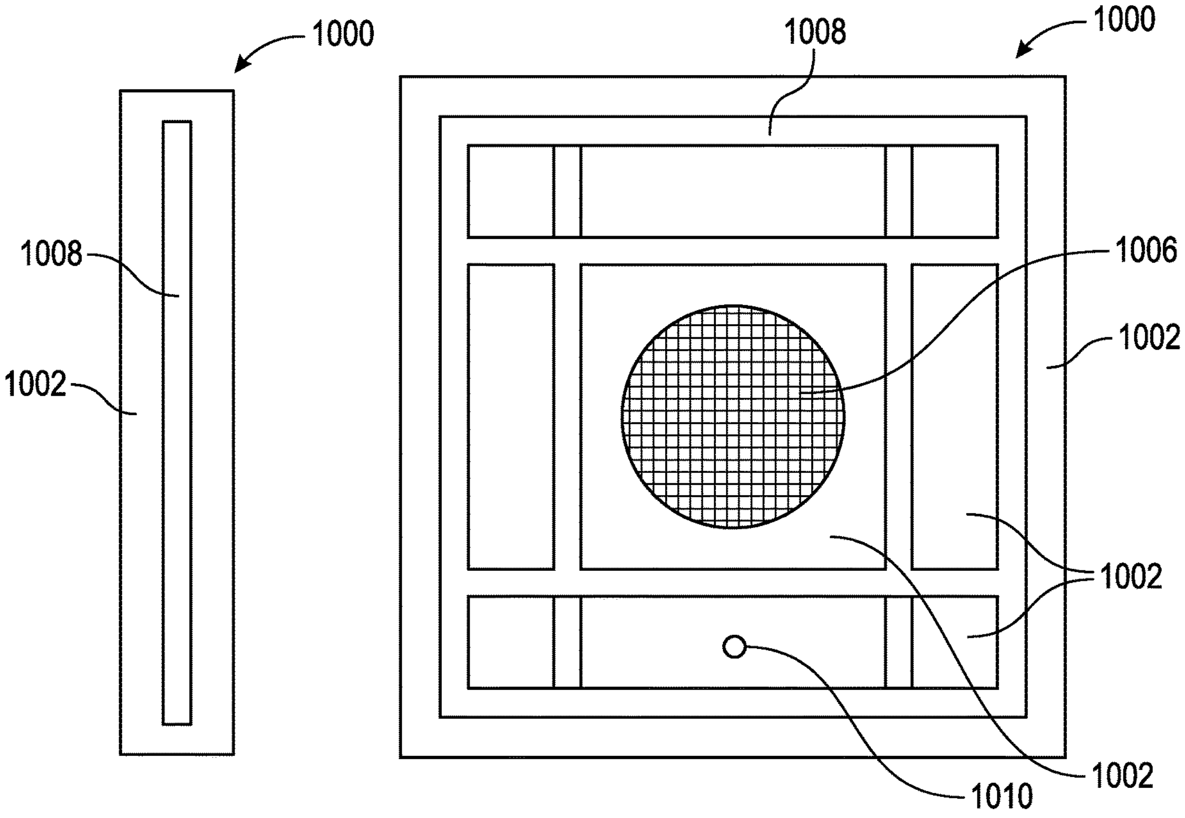
FIGS. 14A and 14B illustrates internal rebar support in side and east-west internal wall views, respectively of a pump housing, in accordance with another embodiment of the present subject matter.

FIGS. 14A and 14B show a side internal frame rebar skeleton embedded within the poured concrete shell and a projected exterior view, respectively of pump housing 1000, in accordance with another embodiment of the present subject matter. Pump housing 1000 includes continuous poured unibody concrete panels 1002. Pump housing 1000 includes filter 1006 at the centre. Pump housing 1000 further includes rebar cage 1008. In one example, pump housing

1000 includes cut-out portion or electrical conduit opening 1010 for receiving plumbing and electrical assemblies for fountain construction.

Figures 15A, 15B:
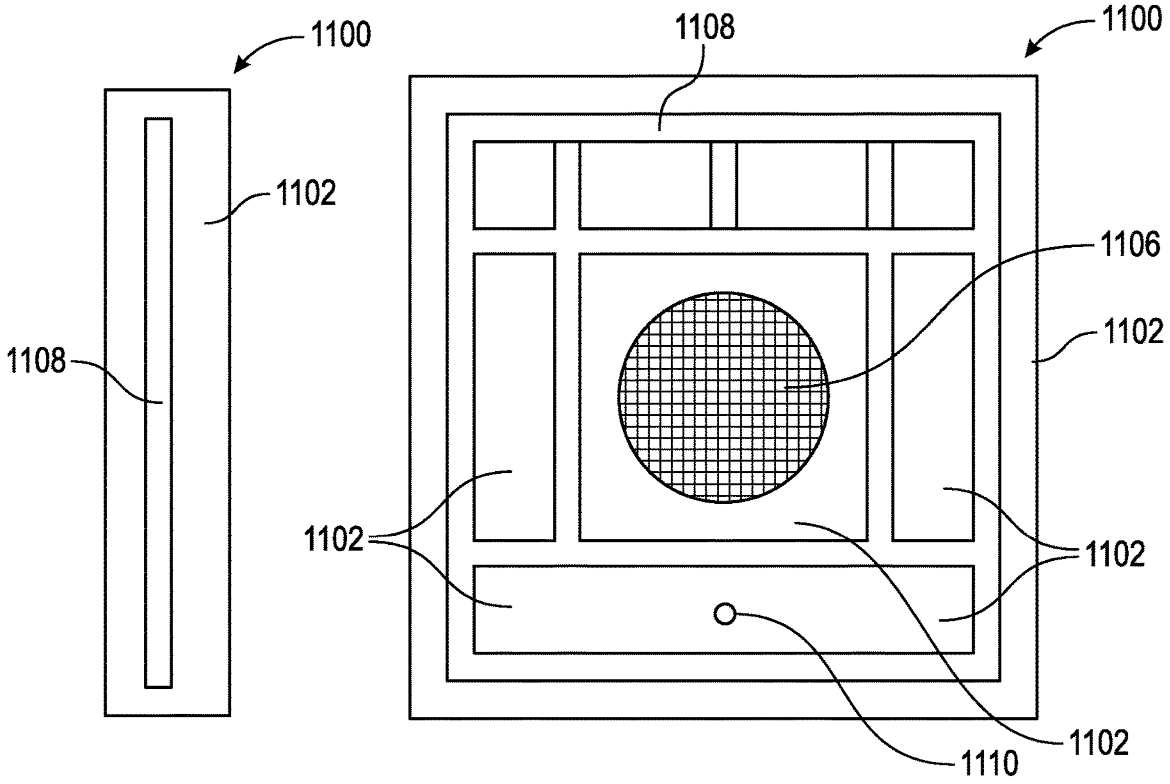
FIGS. 15A and 15B illustrates internal rebar support in side and north-south internal wall views, respectively of a pump housing, in accordance with another embodiment of the present subject matter.

FIGS. 15A and 15B show a side internal frame rebar skeleton embedded within the poured unibody concrete shell and a projected exterior view, respectively of pump housing 1100, in accordance with another embodiment of the present subject matter. Pump housing 1000 includes continuous poured unibody concrete panels 1102. Pump housing 1000 includes filter 1106 at the centre. Pump housing 1000 further includes rebar cage 1108. In one example, pump housing 1000 includes cut-out portion or electrical conduit opening 1110 for receiving plumbing and electrical assemblies for fountain construction.

Figure 16:
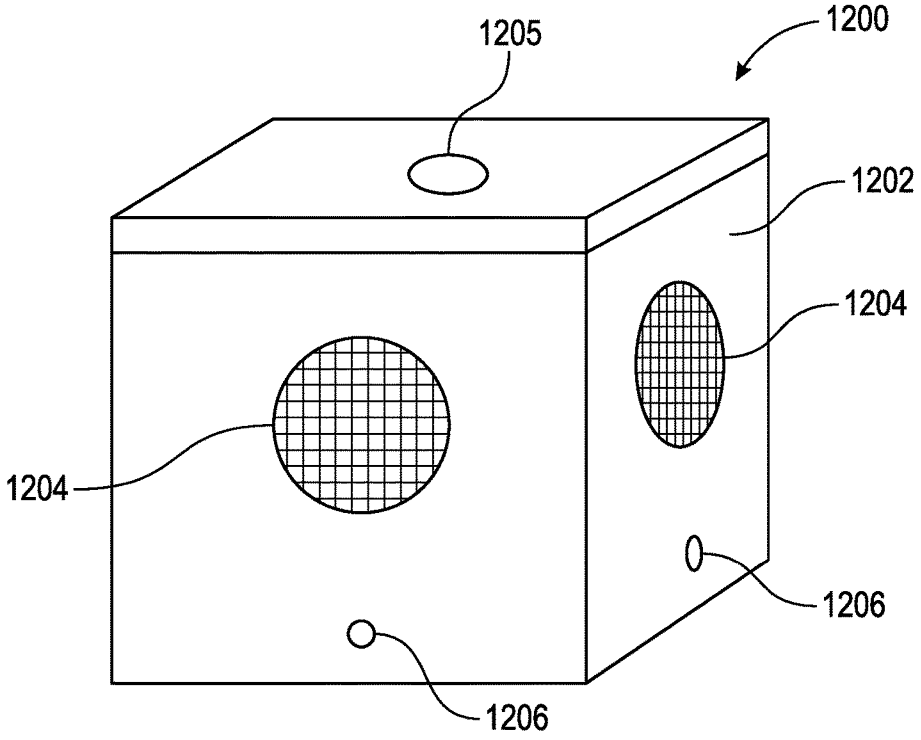
FIG. 16 illustrates a three-dimensional (3D) view of a pump housing pedestal, in accordance with another embodiment of the present subject matter.

FIG. 16 shows a three-dimensional (3D) view of pump housing pedestal 1200, in accordance with one embodiment of the present subject matter. Pump housing pedestal 1200 includes poured concrete housing 1202. Housing 1202 includes filter port water intakes 1204 at sides and discharge port water pump 1205 at the top. Further, housing 1202 includes electrical assembly entrance 1206 for plumbing and electrical assemblies for fountain construction.

Figure 17:
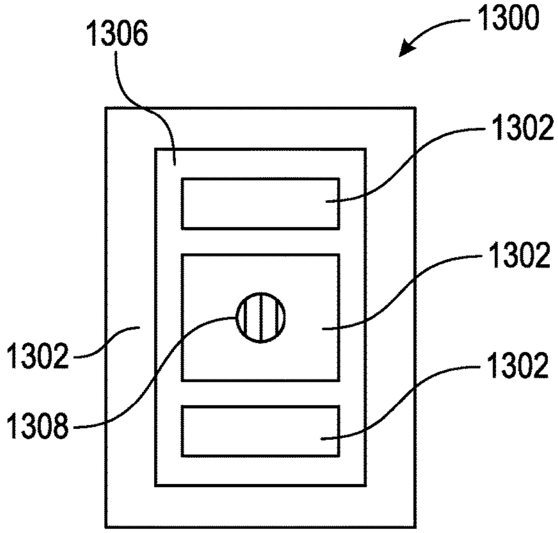
FIG. 17 illustrates a overhead view of the internal structure of the cover of the pump housing, in accordance with another embodiment of the present subject matter.

FIG. 17 shows a top view of pump housing top 1300, in accordance with one embodiment of the present subject matter. Pump housing 1300 includes panels 1302 made of concrete blocks. Poured concrete unibody shell 1302 surrounding the rebar support skeleton. Here, the poured concrete unibody structure serves as a cover for the four walled concrete pedestal. Pump housing 1300 includes rebar 1306 imbedded in the poured concrete unibody structure. Pump housing 1300 include access point 1308 i.e., away water tube hole for pump at the centre for receiving a fountain pump.

Figure 18:
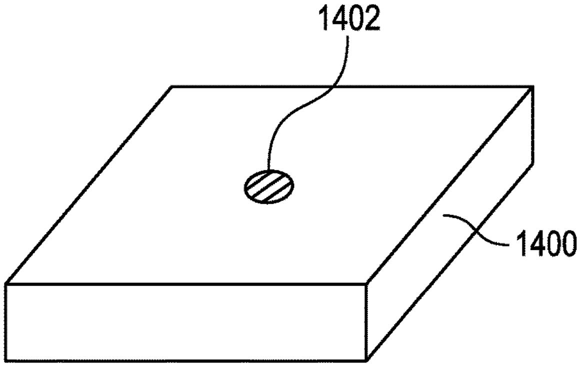
FIG. 18 illustrates a 3-D overhead view of the cover of the pedestal, in accordance with another embodiment of the present subject matter.

FIG. 18 shows an overhead perspective view of pedestal pump housing top 1400, in accordance with one embodiment of the present subject matter. As can be seen, pedestal pump housing top 1400 comes appears to be a thick poured concrete block in a square or rectangular configuration. Pedestal pump housing top 1400 includes away water tube hole 1402 for pump at the centre.

Figure 19:
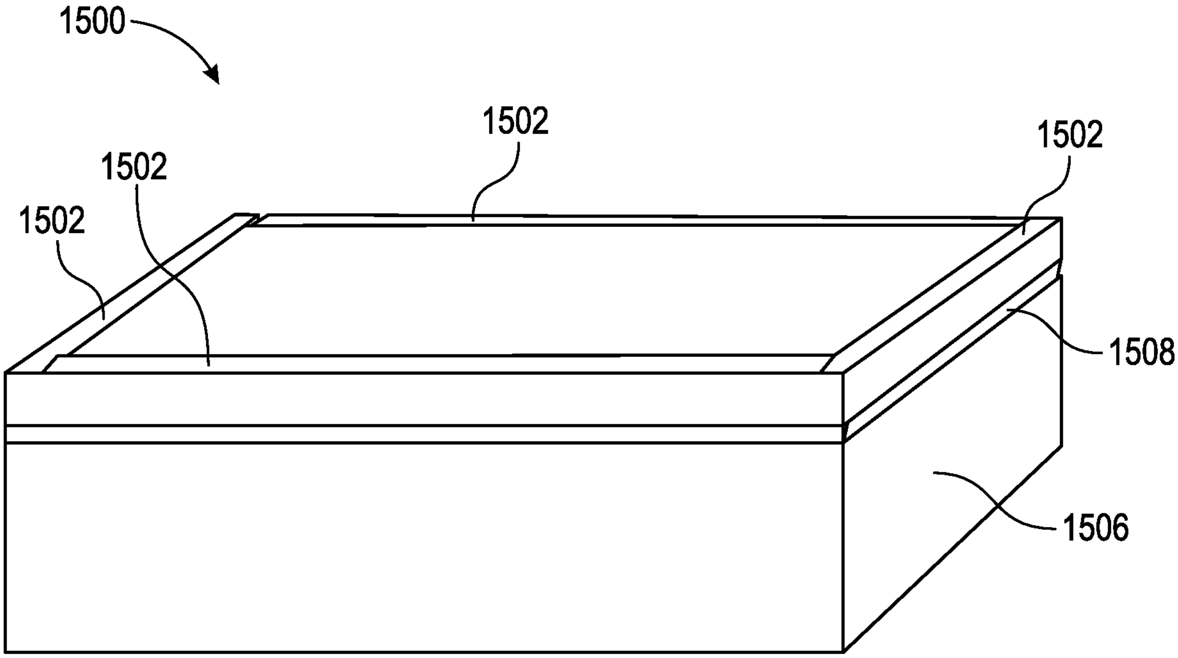
FIG. 19 illustrates a 3-D view of the fully assembled water containment structure in accordance with another embodiment of the present subject matter.

FIG. 19 shows a perspective view of a fully assembled water containment structure 1500, in accordance with one embodiment of the present subject matter. Water containment structure 1500 includes liner 1502. In one example, liner 1502 is made from a material such as ethylene propylene diene monomer (EPDM) to retain and prevent leakage of water from wall section 1506 made of concrete. Liner 1502 is made from a material such as EDPM, for example. Each termination bar 1508 mounts liner 1502 at its side on the concrete wall 1506. Termination bars 1508 ensure liner 1502 does not get slip away from concrete wall section 1506. In one example, liner 1502 connects to concrete wall section 1506 via termination bar 1508. In one example, connecting bar 1508 is made of a material such as a metal, wood or any other suitable material.

In accordance with the present subject matter, a user such as a homeowner, residential or commercial builder, or landscape architect can use the kit and construct a yard fountain that looks like a custom construction. Here, the kit includes pre-constructed parts which the user can utilise as a do-it-yourself (DIY) method without the need for others. The kit comes with instructions for attaching the prefabricated three-inch structural steel channels of various lengths, steel support struts, corner sections, steel corner support gussets, a centre steel support band, eight steel attachment plates, four airplane cord channel joining devices, concrete board inner and outer wall panels. In addition, the kit also includes piping and wiring needed to connect the plumbing and electrical assemblies to external sources. This way, a manufacturer can ship the kit, which the user can use to construct the yard structure. The user can construct a unique yard structure depending on the need and space available. As such, the presently disclosed kit provides excellent utility and expands the choices for the user when designing water features for home and commercial use. The user can use the kit to construct a water feature, fountain base, water reservoir and the like.

The kit can be used to construct water containment structures easily as temporary or permanent structures. Further, if required, the user can uninstall the water containment structure and transport the parts with minimal effort to another location.

A person skilled in the art appreciates that the kit containing prefabricated components may come in a variety of sizes depending on the need and comfort of the user. Further, different materials in addition to or instead of materials described herein may also be used and such implementations may be construed to be within the scope of the present subject matter. Further, many changes in the design and placement of components may take place without deviating from the scope of the presently disclosed kit.

In the above description, numerous specific details are set forth such as examples of some embodiments, specific components, devices, methods, in order to provide a thorough understanding of embodiments of the present subject matter. It will be apparent to a person of ordinary skill in the art that these specific details need not be employed, and should not be construed to limit the scope of the subject matter.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the subject matter, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. It is contemplated that additional embodiments are within the spirit and true scope of the disclosed subject matter.

I claim:

1. A kit including prefabricated components for erecting a prefabricated water containment structure, said kit comprising:

a plurality of prefabricated structural steel channels of various lengths;

a plurality of steel support struts;

corner sections for connecting said steel support struts;

a plurality of steel corner support gussets;

a centre steel support band;

a plurality of steel attachment plates;

a plurality of airplane cord channel joining devices;

a set of concrete board inner and outer wall panels, said inner and outer wall panels containing cut-outs to accommodate prefabricated plumbing and electrical assemblies, said kit further comprising a prefabricated submersible hollow concrete water pump pedestal, said kit yet further comprising piping and wiring for connecting plumbing and electrical assemblies to external sources; and wherein said kit facilitates constructing said prefabricated water containment structure.

2. The kit of claim 1, further comprising a plurality of holes in said channels for permitting liquid to flow through.

3. The kit of claim 1, further comprising a plurality of building panels for providing structural support to said prefabricated water containment structure.

4. The kit of claim 1, further comprising a plurality of individual containment structure support struts within said prefabricated water containment structure.

5. The kit of claim 1, further comprising a support band between channels for further strengthening said prefabricated water containment structure.

6. The kit of claim 1, further comprising a pump housing.

7. The kit of claim 1, further comprising internal rebar support in side and east-west internal wall views, respectively of a pump housing.

8. A method of forming a kit including prefabricated components for erecting a prefabricated water containment structure, said kit comprising the steps of:

forming a plurality of prefabricated structural steel channels of various lengths;

forming a plurality of steel support struts;

forming a plurality of corner sections for connecting said steel support struts;

forming a plurality of steel corner support gussets, forming a centre steel support band, forming a plurality of steel attachment plates, forming a plurality of airplane cord channel joining devices, forming a set of concrete board inner and outer wall panels, said inner and outer wall panels containing cut-outs to accommodate prefabricated plumbing and electrical assemblies;

forming said kit to further comprise a prefabricated submersible hollow concrete water pump pedestal;

forming said kit to yet further comprise piping and wiring for connecting plumbing and electrical assemblies to external sources; and wherein said kit facilitates constructing said prefabricated water containment structure.

9. The method of forming a kit of claim 8, further comprising the step of forming a plurality of holes in said channels for permitting liquid to flow through.

10. The method of forming a kit of claim 8, further comprising the step of forming a plurality of building panels for providing structural support to said prefabricated water containment structure.

11. The method of forming a kit of claim 8, further comprising the step of forming a plurality of individual containment structure support struts within said prefabricated water containment structure.

12. The method of forming a kit of claim 8, further comprising the step of forming a support band between channels for further strengthening said prefabricated water containment structure.

13. The method of forming a kit of claim 8, further comprising the step of forming a pump housing.

14. The method of forming a kit of claim 8, further comprising the step of forming internal rebar support in side and east-west internal wall views, respectively of a pump housing.

* * * * *